United States Patent [19]

Minamida

[11] Patent Number: 4,533,807
[45] Date of Patent: Aug. 6, 1985

[54] COOKING UTENSIL FOR INDUCTION COOKING APPARATUS

[75] Inventor: Ataru Minamida, Higashi-Murayama, Japan

[73] Assignee: Asahi Kogyo Kabushiki Kaisha, Tokyo, Japan

[21] Appl. No.: 708,102

[22] Filed: Mar. 5, 1985

Related U.S. Application Data

[63] Continuation of Ser. No. 402,849, Jul. 29, 1982, abandoned.

[30] Foreign Application Priority Data

Apr. 27, 1982 [JP] Japan .................................. 57-69569

[51] Int. Cl.³ .............................................. H05B 6/12
[52] U.S. Cl. ........................ 219/10.49 R; 219/10.67; 126/390
[58] Field of Search ...................... 219/10.49 R, 10.67, 219/10.79; 126/390; 220/454, 455; 428/653, 926, 928, 931

[56] References Cited

U.S. PATENT DOCUMENTS

| | | | |
|---|---|---|---|
| 888,960 | 5/1908 | Clark | 126/390 X |
| 2,151,535 | 3/1939 | Scurlock | 126/390 |

FOREIGN PATENT DOCUMENTS

| | | | |
|---|---|---|---|
| 109512 | 1/1940 | Australia | 126/390 |
| 561766 | 6/1944 | United Kingdom | 126/390 |

Primary Examiner—Philip H. Leung
Attorney, Agent, or Firm—Stefan J. Klauber

[57] ABSTRACT

A cooking utensil for induction cooking apparatus wherein a magnetic substance layer is provided with the purpose of improving the conventional aluminum-made utensil, at outer surface of the bottom of the aluminum utensil body to enable the use with cooking utensil or cooking device with electromagnetic induction heating system by which the effectiveness of both properties of aluminum material and magnetic substance can be obtained and more general use can be obtained than the use of the conventional cooking utensil.

2 Claims, 2 Drawing Figures

COOKING UTENSIL FOR INDUCTION COOKING APPARATUS

BACKGROUND OF THE INVENTION

This application is a continuation of application Ser. No. 402,849, filed July 29, 1982, abandoned.

The present invention relates to a cooking utensil for induction cooking apparatus and, more particularly to a cooking utensil developed for use with an electromagnetic cooking device, i.e. an induction heating cooking apparatus.

DESCRIPTION OF THE PRIOR ART

Cooking utensils, such as pots and frying-pans have long been used for seething, boiling and baking cooking materials. Recently improved are electromagnetic cooking devices, that is, cooking devices with electromagnetic induction heating system, which flow current from power source to magnetic generating coil so that magnetic lines of force are generated on top plate to make pots and pans located on the said plate exothermic, thus enabling cooking by means of the above heat. Unlike pots or pans being cooked with fire flames by means of gas rings or gas ranges, these electromagnetic cooking devices are advantageous in that the above electromagnetic induction heating system totally eliminates the combustion gas so that there is no need to worry for causing a fire, and further advantages are that air is kept clean and no scorching appears on bottom of the pan or pot, to mention a few.

Although these electromagnetic cooking devices are gaining popularity recently thanks to the above advantages, cooking utensils which can be used for the above device are limited to those of magnetic substance such as iron-enameled pots, 18Cr-stainless pots and iron plates, and utensils of non-magnetic substance such as aluminum pots cannot be used.

In case of using conventional iron-enameled pots, however, for the electromagnetic cooking device there is an obvious disadvantage that the above iron-enameled pots are not easily handled due to heavy body weight. Moreover, the iron frying pans and the like are unsuitable for "broiling or roasting" cooking materials since they are likely to become overheated locally and cannot stand use for long sustained hours under hot temperature.

SUMMARY OF THE INVENTION

The present invention is developed to improve the above disadvantages of the conventional cooking utensils. The object of this invention, therefore, is to provide a utensil for an electromagnetic cooking device i.e. induction heating cooking apparatus in which magnetic substance is formed at least to the outer surface of the bottom of aluminum utensil body to enable not only to boil but also to roast or to broil cooking materials. The above and other objects, benefits, features and uses will become more apparent as the description proceeds, when considered with the accompanying drawings.

BRIEF DESCRIPTION OF PREFERED EMBODIMENT

Figure 1:
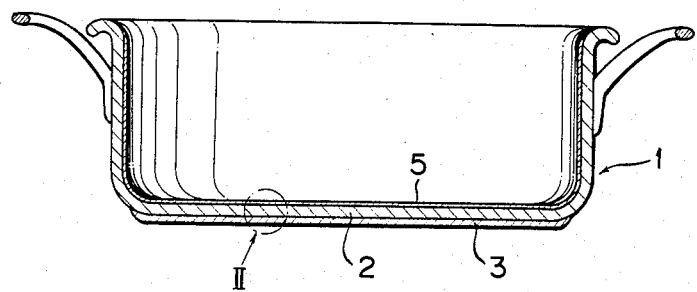
FIG. 1 is a whole cross-sectional view of a pot in perspective of an embodiment of this invention.
Figure 2:
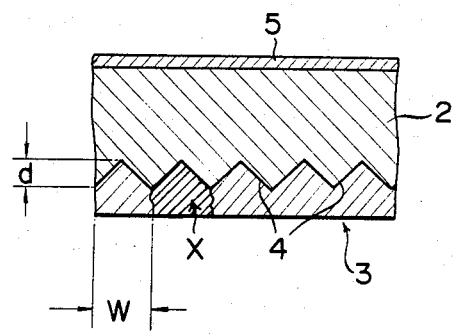
FIG. 2 is an enlarged partially cross-sectional view taken in the part II as shown in an arrow line of FIG. 1.

Referring now to the prefered embodiment illustrated in the drawings, following is a detailed explanation of the present invention. Numeral number 1 is a utensil body of aluminum or aluminum alloy, and magnetic substance layer 3 is formed to the outer surface of bottom 2 of the utensil body 1. Magnetic substance layer 3 is formed to all of outer surface of the bottom 2. The said layer 3 is preferably comprising more than 0.1 mm (millimeter) thickness magnetic substance for satisfactory exothermal function, and is to be formed at least on the whole outer surface of bottom 2. Any materials of magnetic substance can be adopted for the above magnetic substance layer 3, which is formed to the outer surface of the bottom 2 treated by already well-known methods such as metal spraying.

It is preferable to form the magnetic substance layer 3 in such a way that concave and convex faces are made in a border of the outer surface of bottom 2 of the aluminum or aluminum alloy utensil body 1 and the magnetic substance layer 3. As illustrated in the drawings, an example of the above "concave and convex" is shown in the following manner. At the outer surface of the bottom 2, plural numbers of V-shaped cuts 4 are formed wherein iron, as being the magnetic substance, is sprayed to constitute the magnetic substance layer 3. According to an experiment by the inventor, a size of depth (d) and width (w) of the V-shaped cut 4 is preferably 0.5 mm respectively, however various shapes, sizes and directions of the cut 4 can be of course selected in accordance with a shape of the utensil body 1. In case that the utensil body 1 is a frying-pan, concentric circular V-shaped cut with the depth (d) of 0.5 mm and the width (w) of 0.5 mm are mostly preferable. The "concave and convex" forming including V-shaped cut 4 at the border as already described is necessary because:

(a) As heating areas expand, better thermal conductivity is obtained to get high temperature. (According to the experiment by the inventor, it was proved that in case of frying-pan of 20 cm diameter, it took 8 minutes to seethe 1 liter of water if V-shaped cut 4 is provided whereas it took 17 minutes to seethe the same quantity of water if no cut is provided,).

(b) Thermal shock resistance is further strengthened, and the magnetic substance layer 3 is hard to detach even if cooled down quickly. Moreover, in case of being subjected to a considerable thermal shock, only partial detachment (refer to part X in the Figure) occurs and thus prevents detachment of the whole magnetic substance layer 3.

(c) Adherence area of aluminum or aluminum alloy and magnetic substance (iron, for example) is widened, and mechanical strength is thus enhanced.

In the figure, numeral number 5 is an inner treated layer which means coating layer comprised of fluorine-containing resins such as "Teflon" (registered trademark). In the above and following explanation, the "layer" of magnetic substance layer 3 and inner treated layer 5 is defined in a broad sense.

Following is an experimental Example. Plural numbers of cooking utensils (No. 1 to No. 7) were prepared for the experiment. Items No. 1 and No. 2 are conventional utensils and items No. 3 to No. 7 are utensils in accordance with present invention.

| Item No. | |
|---|---|
| 1. | Frying-pan with a diameter of 24 cm, made of aluminized iron plate with thickness of 1.6 mm depth. |
| 2. | A pot with a diameter of 18 cm, made of an iron-enamel. |
| 3. | A frying-pan with a diameter of 24 cm, with magnetic substance layer wherein iron material with thickness of 0.8 mm is brazed at the outer surface of the bottom of aluminum or aluminum alloy utensil body with thickness of 2.0 mm. |
| 4. | A saucepan with a diameter of 20 cm, with magnetic substance layer wherein iron with the thickness of 0.5 mm is sprayed to the outer surface of the bottom of the aluminum or aluminum alloy utensil body with thickness of 3.0 mm. |
| 5. | A saucepan, with a diameter of 24 cm, with a magnetic substance layer of iron with 0.5 mm thickness sprayed to the outer surface of the bottom of the aluminum or aluminum alloy utensil body with thickness of 4.0 mm. |
| 6. | A frying-pan with a diameter of 24 cm, with a magnetic substance layer with V-shaped cut with 0.5 mm depth and width respectively wherein iron with thickness of 0.5 mm is sprayed to the outer surface of the bottom of aluminum or aluminum alloy utensil body with 0.5 mm thickness. |
| 7. | A frying-pan with a diameter of 24 cm, with a magnetic substance layer of iron with 0.15 mm thickness sprayed to the outer surface of the body of aluminum or aluminum alloy utensil body with thickness of 4.0 mm. |

[Experiment I]

1 liter of water was poured respectively into the above utensil items (No. 1–No. 7) each of which was set on the electromagnetic cooking device and the boiling time required was measured. As shown in the following Table 1, result of the experiment led to that the items under the present invention (No. 3 to No. 6), in as much as the utensil body being consisted of aluminum alloy, took the same period of time to boil water as the conventional items made of iron (Item No. 1 and No. 2). Item 7 under the present invention took twice as much time as the items No. 3 to No. 6 because magnetic substance layer is particularly thin compared with other items. (No. 3 to No. 6)

TABLE 1

| Item No. | Boiling time required |
|---|---|
| 1. | 8 Minutes and 30 seconds |
| 2. | 8 minutes |
| 3. | 8 minutes and 30 seconds |
| 4. | 9 minutes and 40 seconds |
| 5. | 9 minutes and 40 seconds |
| 6. | 9 minutes and 30 seconds |
| 7. | 17 minutes |

[Experiment II]

Burning test in unloaded condition was conducted on items (No. 1 to No. 7), and the result was shown in the following Table II.

TABLE II

| Item No. | Result |
|---|---|
| 1. | Local heat was developed after more than 3 minutes. The inner temperature became more than 450° C. (842° F.) and corresponding part of the frying-pan to the magnetic generating coil in the electromagnetic cooking device became red-burned condition. It was no longer possible to use afterwards. |
| 2. | After more than 10 minutes, the enamel was damaged and no longer possible to use afterwards. |
| 3. | Maximum peak temperature attained in 10 minutes. The inner temperature became 446° C. (834.8° F.) and sustained the same temperature afterwards. |
| 4. | Maximum peak temperature attained in 14 minutes. The inner temperature was 345° C. (653° F.) and sustained the same temperature afterwards. |
| 5. | Maximum peak temperature attained in 11 minutes. The inner temperature became 360° C. (680° F.), and sustained the same temperature afterwards. |
| 6. | Maximum peak temperature attained in 14 minutes. The inner temperature became 350° C. (662° F.) and sustained the same temperature afterwards. |
| 7. | Maximum peak temperature attained in 15 minutes. The inner temperature became 290° C. (554° F.) and sustained the same temperature. |

Followings are result of the above burning test in unloaded condition. The items under the present invention (No. 3 to No. 7) took as three to five times much time as the conventional item (No. 1) to attain the maximum peak temperature, which means the strong resistance aginst burning in unloaded condition, since time required is proportional to the strength of the above resistance. It was further noted that the maximum peak temperature of the items under present invention (No. 4–No. 7) is under 360° C. (680° F.) respectively, and even if cooking utensil which is coated with Teflon at the outer surface of cooking utensil body is used, this coating layer will not be decomposed or detached since the Teflon coating layer tends to decompose or detach only at temperatures of more than 400° C. (752° F.). The conventional item No. 1, therefore, is subject to a damage of the inner Teflon coating layer within about three minutes. Moreover, the item No. 3 under the present invention which has the thickest magnetic substance layer showed the same result as that of the enameled pot (the conventional item No. 2), which proved outstanding property of the items under the present invention.

[Experiment III]

Heat uniformity test was conducted on the above Item No. 1, No. 3,4,5,6, and No. 7. Each item was set on the electromagnetic cooking device and heating respectively. Five points of the bottom of body of each item (Central point falls to point A, and point B,C,D, and E follow peripherally) were subject to a temperature measurement. According to the experiment, the temperature of point A of the item No. 1 became 450° C. (842° F.) in three minutes and that of point B to E became 600° C. (1112° F.) during the same period and difference of temperature of 150° C. (302° F.) was observed in the item No. 1. It may be clearly understood that such difference of temperature means that the item is easily subject to local overheating. Compared with that, the above test indicated that the temperature of the item No. 3 became 446° C. (834.8° F.) in ten minutes, that of the item No. 4, 345° C. (653° F.) in 14 minutes, that of item No. 5, 360° C. (680° F.) in 11 minutes, that of item No. 6, 350° C. (662° F.) in 14 minutes, and that of item No. 7, 290° C. (554° F.) in 15 minutes, and temperature difference among point A to point E was within 10° C. (50° F.) in each item. It was also clearly understood that the above testing result indicates that items under the present invention possess outstanding heat dispersion properties since their body is made of aluminum or an aluminum alloy. Therefore, no "scorch" occurs.

The described invention provides the magnetic substance layer at least outside of the bottom of the aluminum or aluminum alloy utensil body which enables the use of the electromagnetic cooking device for not only boiling and frying cooking materials but also for roasting or broiling materials which cooking methods could not be used by means of already manufactured cooking utensils which were made of only magnetic substance. The present invention further provides outstanding property of aluminum or aluminum alloy which is consisting the utensil body, i.e. good heat uniformity and good heat conductivity as well as other characteristics of light weight, easy-handling, low cost, and guarantees economical use with easy-cooking. While the invention has been particularly shown and described with reference to preferred embodiments thereof, it will be understood by those skilled in the art that the foregoing and other changes in form and details can be made therein without departing from the spirit and scope of the invention.

I claim:

1. A cooking utensil for use with induction heating cooking apparatus, comprising:

an aluminum or aluminum alloy utensil body, and a magnetic substance layer provided at at least the outer surface of said utensil body at the bottom thereof;

the interface between said magnetic substance layer and said utensil body, being comprised of a plurality of concave and convex faces defined by a series of successive adjacent V-shaped internesting portions at the respective adjoining surfaces of said magnetic substance layer and said utensil body;

said utensil body having a flat inwardly directed cooking surface which is coated with a flourine-containing resin; and the said magnetic substance layer being comprised of iron sprayed to the said outer surface of said bottom of said utensil body.

2. A cooking utensil according to claim 1 which is characterized in that the said magnetic substance layer has more than 0.1 mm thickness.

* * * * *

UNITED STATES PATENT AND TRADEMARK OFFICE
CERTIFICATE OF CORRECTION

PATENT NO. : 4,533,807
DATED : August 6, 1985
INVENTOR(S) : Ataru Minamida

It is certified that error appears in the above-identified patent and that said Letters Patent are hereby corrected as shown below:

On the cover page, the Assignee should be corrected to read as follows:

[73] Assignee: Asahi Giken Kogyo Kabushiki Kaisha

Signed and Sealed this

Fifteenth Day of July 1986

[SEAL]

Attest:

Attesting Officer

DONALD J. QUIGG

Commissioner of Patents and Trademarks